United States Patent [19]

Matsuno et al.

[11] Patent Number: 5,061,839
[45] Date of Patent: Oct. 29, 1991

[54] LASER BEAM MACHINING APPARATUS

[75] Inventors: Tsukasa Matsuno; Kiyoshi Sato, both of Aichi, Japan

[73] Assignee: Mitsubishi Denki K.K., Tokyo, Japan

[21] Appl. No.: 640,343

[22] Filed: Jan. 11, 1991

[30] Foreign Application Priority Data

Mar. 6, 1990 [JP] Japan .................................. 2-54386

[51] Int. Cl.$^5$ ............................................. B23K 26/02
[52] U.S. Cl. ........................... 219/121.83; 219/121.78; 219/121.75; 219/121.84
[58] Field of Search ....................... 219/121.83, 121.79, 219/121.78, 121.75, 121.84, 121.63, 121.64

[56] References Cited

U.S. PATENT DOCUMENTS 3,569,660  3/1971  Houldcroft ..................... 219/121.68

FOREIGN PATENT DOCUMENTS 57-159285  10/1982  Japan .
0193795   8/1986   Japan .............................. 219/121.78
0279093  12/1987   Japan .............................. 219/121.63
0286696  12/1987   Japan .............................. 219/121.78
63-189492 12/1988   Japan .

Primary Examiner—C. L. Albritton
Attorney, Agent, or Firm—Sughrue, Mion, Zinn, Macpeak & Seas

[57] ABSTRACT

A laser beam machining apparatus, in which the focal position of the laser beam is changed, for instance, from the upper surface of a workpiece to the lower surface during laser beam machining, the optical axis of the laser beam passed through the optical system is not affected, and the gap between the nozzle and the workpiece is maintained optimum at all times. The laser beam machining apparatus comprises an optical system for concentrating a laser beam, a holder for holding the optical system, first drive means for moving the holder along the optical axis of the laser beam, a nozzle slidably engaged with the holder, jetting a machining gas or the like, and second drive means for moving the nozzle.

7 Claims, 3 Drawing Sheets

LASER BEAM MACHINING APPARATUS

BACKGROUND OF THE INVENTION

This invention relates to a laser beam machining apparatus, and more particularly to a machining head for controlling the focal position of the laser beam.

FIG. 2 shows an external appearance of an ordinary laser beam machining apparatus.

In FIG. 2, reference numeral 1 designates a laser beam machining head; 2, a Z-axis unit for moving the machining head 1 vertically (in a direction of Z-axis); 3, a Y-axis unit for moving the Z-axis unit 2 back and forth (in a direction of Y-axis); 4, a column supporting the Y-axis unit 3; 5, a bed; 6, a table moving right and left (in a direction of X-axis) on the bed 5; and 7, a metal cover for protecting a table drive mechanism adapted to drive the table.

FIG. 3 shows the arrangement of the machining head in the conventional laser beam machining apparatus which has been disclosed, for instance, by Unexamined Published Japanese Patent Application No. 159285/1982 or Unexamined Published Utility Model Application 189492/1988.

In FIG. 3, reference numeral 8 designates a laser beam; 9, an optical system, such as a lens, for concentrating the laser beam 8; 10a, an inner holder holding the optical system 9; 10b, an outer holder holding the inner holder 10a; 11, a drive unit for driving the inner holder 10a inside the outer holder 10b in such a manner that the inner holder 10a is moved along the optical axis (vertically in FIG. 3); 12, a nozzle whose outer wall is threaded (not shown) so that it is threadably engaged with the outer holder 10b; that is, the nozzle is turned so as to go in and out of the outer holder to adjust the length of protrusion of the nozzle 12; 13, a workpiece; 14 and 15, an electric motor and a screw mechanism, respectively, which are used for moving the machining head 1; 16, a control unit for applying drive signals to the motor 14; 17, a profiling unit for measuring the distance between the outer holder 10b and the workpiece 13; 18, a signal line for transmitting the output signal of the profiling unit 17 to the control unit 16; and 19, a signal line for applying the output signal of the control unit 16 to the motor 14.

The operation of the laser beam machining apparatus thus organized will be described.

In general, a laser beam machining operation is carried out by applying the laser beam 8, concentrated by the optical system 9, to the workpiece 13. During the machining, it is essential to hold the focal position of the laser beam 8 at a predetermined position with respect to the workpiece 13. For this purpose, the profiling unit 17 is used. The output signal of the profiling unit 17 is applied to the control unit 16, which applies, in turn, a drive signal to the motor 14 so that the distance between the outer holder 10b and the workpiece 13 becomes a predetermined value. Accordingly, as long as the position of the optical system 9 is maintained unchanged inside the outer holder 10b, the focal position of the laser beam 8 is held at a predetermined distance from the upper surface of the workpiece 13.

In the case where, for instance, the laser beam 8 is focused on the upper surface of the workpiece 13 as shown in FIG. 3, the focal position of the laser beam 8 is as follows: That is, as long as the position of the optical system 9 and the settings of other components are maintained unchanged, the focal position of the laser beam 8 is maintained on the upper surface of the workpiece 13 even if the thickness of the workpiece 13 changes.

In a laser beam machining operation, it is also essential to keep the distance (gap) between the nozzle 12 and the workpiece 13 constant, because the gap affects the stream of the machining gas (generally, Oxygen) which is jetted from the nozzle 12 to accelerate the machining operation, thus affecting the machining operation. Generally, the gap is set to about 1 mm. In this case, the nozzle 12 is turned manually, to adjust the length of protrusion of the nozzle 12.

In a laser beam machining operation, generally the laser beam 8 is focused on the upper surface of the workpiece 13; however, depending on the type of workpiece 13, it may provide a better result to focus the laser beam 8 on the lower surface of the workpiece 13.

In this case, the drive unit 11 is operated to move the inner holder 10a downwardly as much as the thickness of the workpiece 13.

The conventional laser beam machining apparatus is constructed as described above. Therefore, when the optical system (or lens) is moved vertically, the optical axis of the laser beam passed through the optical system may be affected because of the play of the drive mechanism. That is, the central axis of the optical system is parallel-moved or inclined relative to the optical axis of the incident laser beam. In order to overcome this difficulty, it is necessary to use the optical system holding mechanism and the optical system moving mechanism which are high in precision. Employment of such mechanisms will unavoidably increase the manufacturing cost of the machining apparatus. In addition, it is necessary to move both the optical system and its holder, and the movable components are considerably large in weight, and their drive units are also necessary bulky. Accordingly, the machining head is large as a whole, and its inertia is great. Thus, the response of the machining head to the control signal is lowered.

In the case where it is required to focus the laser beam on the lower surface of the workpiece, in order to maintain the gap best it is necessary to adjust the length of protrusion of the nozzle whenever the thickness of the workpiece changes, which requires lot of time and labor. Even if the laser beam should be focused on the lower surface of the workpiece during machining (cutting), sometimes it is preferable to focus the laser beam on the upper surface of the workpiece in forming a machining (cutting) start hole in the workpiece. In such a case, it is impossible to obtain the optimum gap for both the machining operation and the machining-start-hole forming operation.

SUMMARY OF THE INVENTION

Accordingly, an object of this invention is to eliminate the above-described difficulties accompanying a conventional laser beam machining apparatus. More specifically, an object of the invention is to provide a laser beam machining apparatus low in manufacturing cost and small in size, in which the focal position of the laser beam is changed, for instance, from the upper surface of a workpiece to the lower surface during laser beam machining, the optical axis of the laser beam passed through the optical system is not affected, and the gap between the nozzle and the workpiece is maintained optimum at all times.

A laser beam machining apparatus according to a first aspect of the invention comprises: an optical system for concentrating a laser beam; holding means for holding the optical system; first drive means for moving the holding means along the optical axis of the laser beam; a nozzle slidably engaged with the holding means, jetting a machining gas or the like; and second drive means for moving the nozzle.

A laser beam machining apparatus according to a second aspect of the invention comprises: an optical system for concentrating a laser beam; holding means for holding the optical system; first drive means for moving the holding means along the optical axis of the laser beam; first detecting means for detecting the distance between the holding means and a workpiece which is changed as the holding means is moved by the first drive means; a nozzle slidably engaged with the holding means, jetting a machining gas or the like; second drive means for moving the nozzle; and second detecting means for detecting the distance between the nozzle and the workpiece which is changed as the nozzle is moved by the second drive means.

In the laser beam machining apparatus according to the first aspect of the invention, the length of extension of the nozzle in the machining head is changed by motive power with the position of the optical system maintained unchanged in the machining head. Hence, even when the laser beam is focused on the upper or lower surface of the workpiece or other parts, the optical axis of the laser beam is not affected, and the length of extension of the nozzle can be adjusted with ease, thus providing the optimum gap at all times.

In the laser beam machining apparatus according to the second aspect of the invention, the length of extension of the nozzle in the machining head is changed by motive power with the position of the optical system maintained unchanged in the machining head and the means for detecting the distance between the nozzle and the workpiece, so that the result of measurement is utilized to adjust the length of extension of the nozzle, thereby to maintain the distance between the nozzle and the workpiece constant. Thus, the optimum gap is provided at all times.

DETAILED DESCRIPTION OF THE PREFERRED EMBODIMENT

Figure 1:
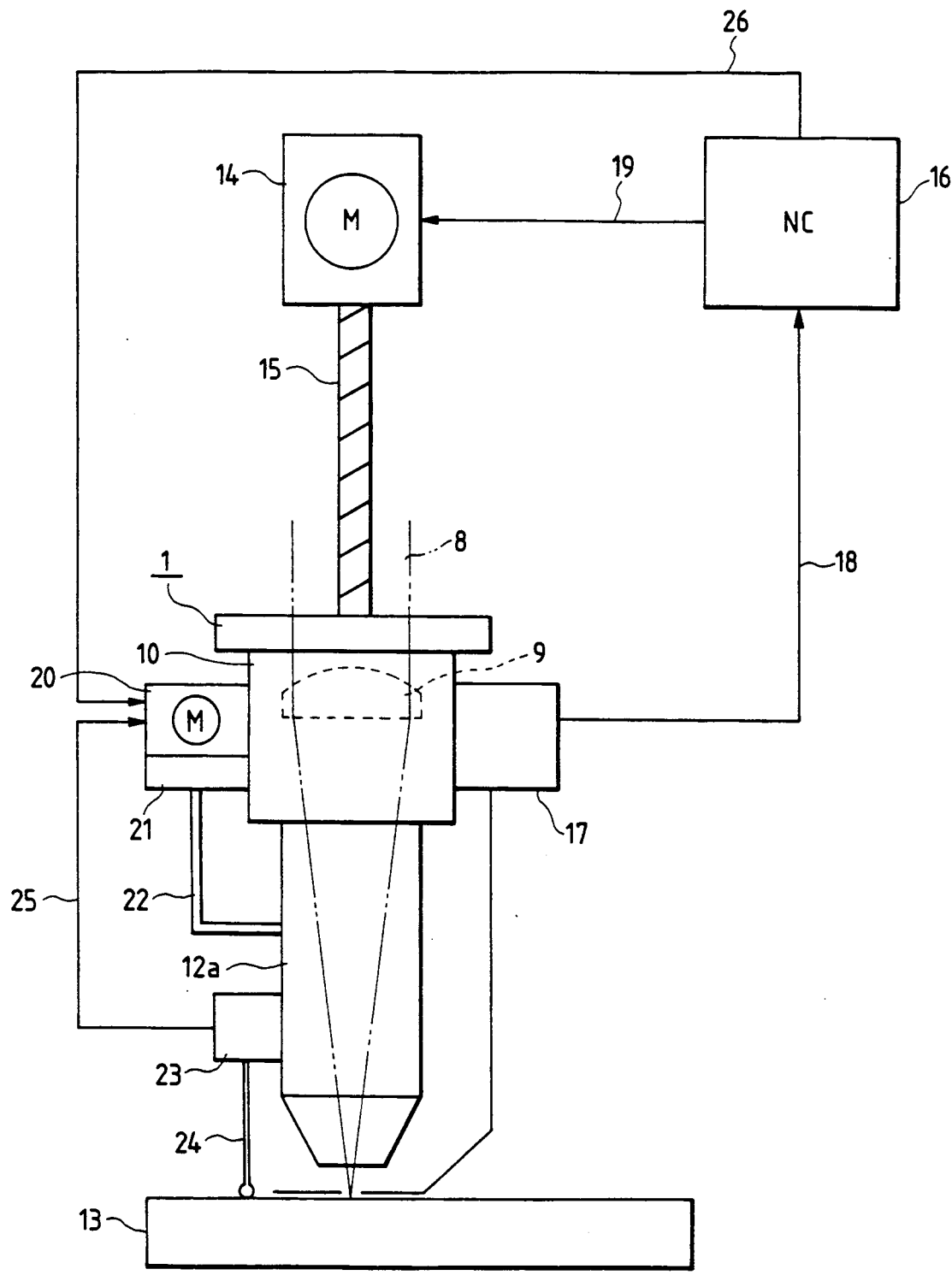
FIG. 1 is an explanatory diagram showing the arrangement of the machining head in a laser beam machining, apparatus, one embodiment of this invention, in detail.
Figure 2:
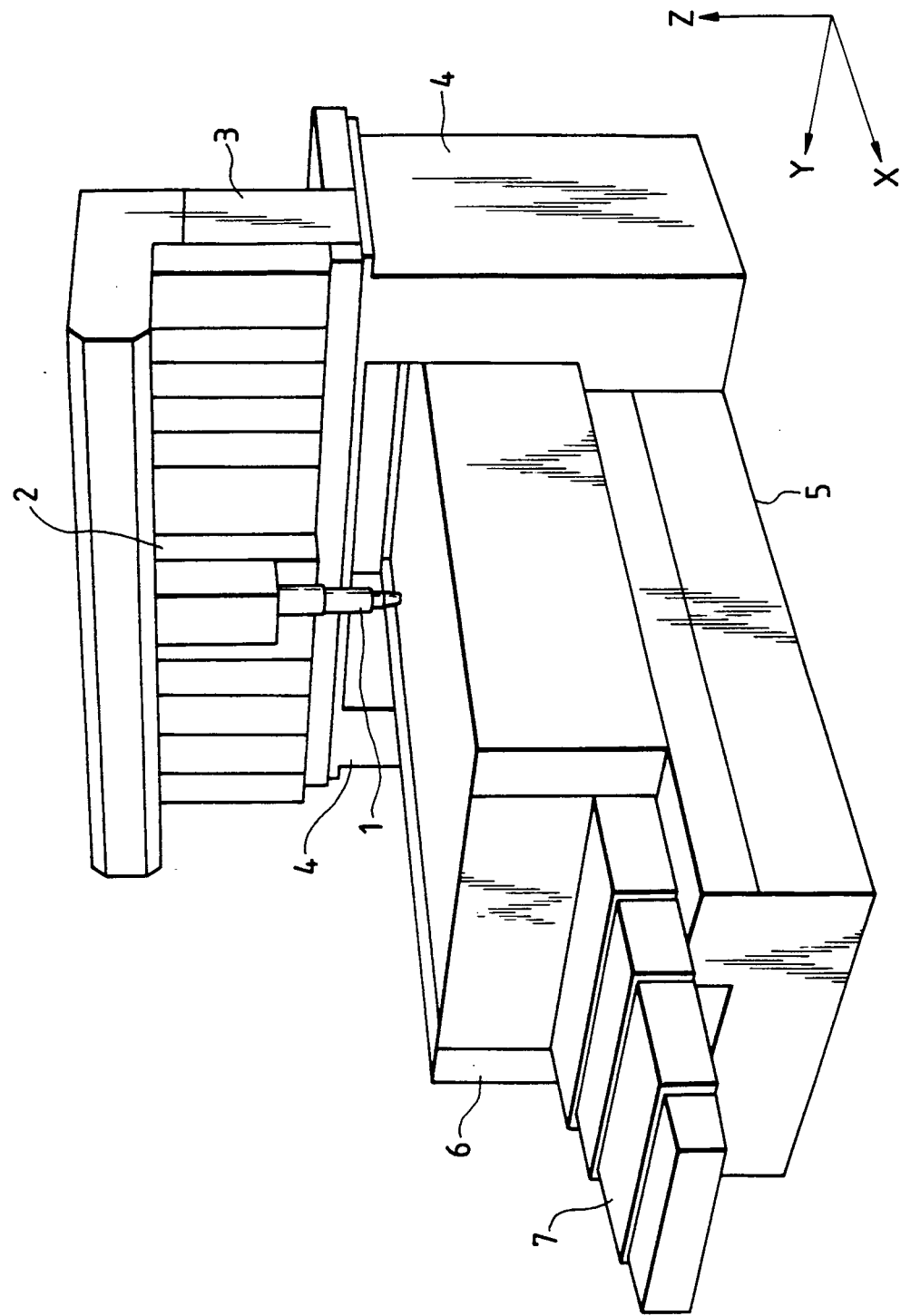
FIG. 2 is a perspective view showing an external appearance of a general laser beam machining apparatus.

FIG. 1 is a diagram showing the machining head of a laser beam machining apparatus, one embodiment of this invention, in detail.

Figure 3:
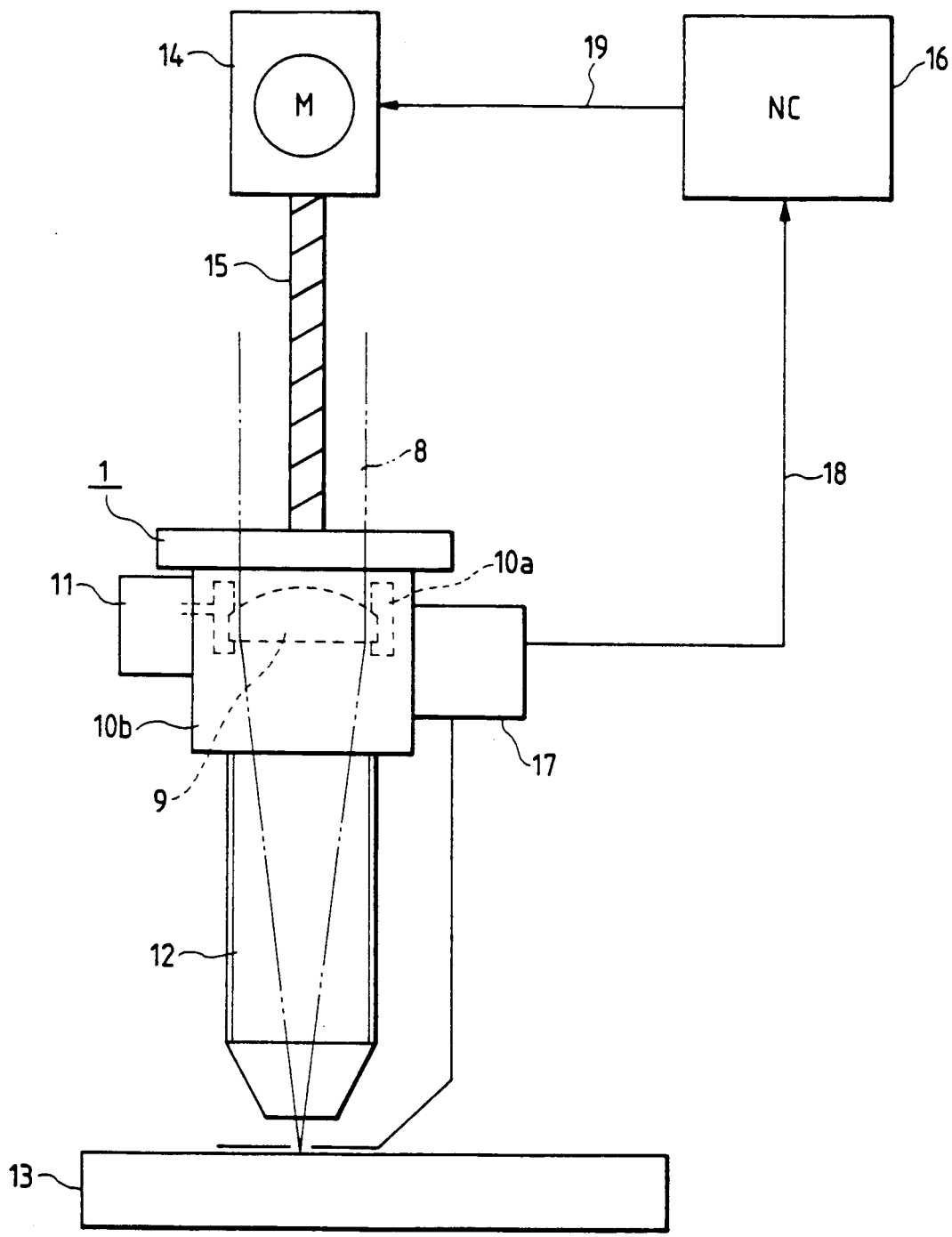
FIG. 3 is an explanatory diagram showing the arrangement of the machining head in a conventional laser beam machining apparatus.

In FIG. 1, reference numerals 1, 8, 9 and 13 through 19 designate the same items as those in FIG. 3 showing the conventional machining head. Further in FIG. 1, numeral 10 designates a holder holding the optical system 9; and 12a, a nozzle. The holder 10, unlike that in the conventional machining head, is one unit, being not separated into the inner and outer holders. The outer wall of the nozzle 12a is not threaded, so that the nozzle 12a is vertically slidable in the holder 10. It should be noted that for convenience in illustration, the nozzle 12a is shown enlarged in FIG. 1; however, in practice the nozzle 12a is sufficiently small and light. Further in FIG. 1, reference numeral 20 designates an electric motor mounted on the holder 10 to move the nozzle 12a up and down; 21, a gear box for converting the rotational motion of the motor 20 into linear motion; 22, a link for moving the nozzle 12a vertically; 23, a gap sensor for measuring the distance (gap) between the nozzle 12a and the workpiece 13, to apply a control signal to the motor 20 so that the gap is maintained a predetermined value (set value); 24, the contactor of the gap sensor 23; 25, a signal line for transmitting the output signal of the gap sensor 23 to the motor 20; and 26, a signal line connected between the motor 20 and the control unit 16 so that the motor 20 is controlled by the control unit 16 when required.

The operation of the laser beam machining apparatus thus organized will be described.

In the case of FIG. 1, the focal position of the laser beam 8 is on the upper surface of the workpiece 13. It is assumed that, in this case, the gap is set to the most suitable value, and the control unit 16 stores this condition as a "reference". In an ordinary machining operation in which the focal position of the laser beam 8 is set on the upper surface of the workpiece 13, the distance between the holder 10 and the workpiece 13 is detected by the profiling unit 17 with the nozzle 12a held as it is. The machining operation is carried out under controlling of the profiling unit 17.

In a machining operation in which the laser beam 8 is focused on the upper surface of the workpiece 13 to form a machining start hole there in, and is then set to the lower surface of the workpiece 13 to machine the latter, the apparatus is operated as follows: In forming the machining start hole, the machining operation is carried out with the machining head 1 held at the above-described "reference" position. Thereafter, the control unit 16 applies a control signal to the motor 14 so that the machining head 1 is lowered as much as the thickness of the workpiece 13, and simultaneously a control signal to the motor 20 to lift the nozzle 12a as much as the thickness of the workpiece 13.

Thus, the focal position of the laser beam 8 is moved to the lower surface of the workpiece 13 with the gap set to the optimum value. Thereafter, similarly as in the ordinary machining operation, the machining operation can be carried out while being controlled by the profiling unit 17 with the nozzle 12a held stationary. In the above-described machining operation, while the machining head 1 is moved downwardly as much as the thickness of the workpiece 13, the nozzle 12a is moved upwardly by the same distance. However, the distance of downward movement of the machining head 1 and the distance of upward movement of the nozzle 12a may be different from each other.

Now, the functions of the gap sensor 23 and its contactor 24 shown in FIG. 1 will be described. It is assumed that, as shown in FIG. 1, the laser beam 8 is focused on the upper surface of the workpiece 13, and the gap is set to the most suitable value. An ordinary machining operation, in which the laser beam 8 is focused on the upper surface of the workpiece 13, is carried out while being controlled by the profiling unit 17. When, in this operation, the profiling unit 17 detects the undulations of the surface of the workpiece 13, the machining head 1 is moved up and down; however, at the same time, the contactor 24 of the gap sensor 23 also detects the undulations of the surface of the workpiece 13, to adjust the length of protrusion of the nozzle 12a. Thus, the gap is maintained unchanged. In a machining operation, in which the laser beam 8 is focused on the upper surface of the workpiece 13 to form a machining start hole therein, and it is focused on the lower surface of the workpiece 13 to machine the latter, the machining start hole is formed under the same conditions (as shown in FIG. 1) as those in the above-described operation. Upon completion of the formation of the machining start hole, the control unit 16 applies a control signal to the motor 14, so that the machining head 1 is moved downwardly as much as the thickness of the workpiece 13. In this operation, the gap sensor 23 detects the change (or reduction) of the gap and applies a control signal to the motor 20 to decrease the length of protrusion of the nozzle 12a, thereby to maintain the optimum gap.

Thus, the focal position of the laser beam 8 can be shifted to the lower surface of the workpiece 13 with the gap set to the optimum value. The following machining operation can be carried out in the ordinary manner.

In the above-described embodiment, the nozzle 12a is moved with the motor 20; however, instead of the motor 20, a hydraulic cylinder or air cylinder may be employed. That is, any means may be employed which can move the nozzle 12a vertically.

Furthermore, in the above-described embodiment, the gap sensor 23 is of contact type; however, it may be replaced with an electrostatic type gap sensor. That is, any means can be employed which can detect the gap.

In the laser beam machining apparatus according to the invention, the length of extension of the nozzle in the machining head can be changed with the position of the optical system maintained unchanged in the machining head, and when the control unit outputs a control signal to move the machining head vertically, a signal is outputted to move the nozzle in the direction opposite to the direction of movement of the machining head. Therefore, the laser beam machining apparatus is low in manufacturing cost, small in size and high in response. Furthermore, with the laser beam machining apparatus, even when the focal position of the laser beam is shifted from the upper surface of the workpiece to the lower surface during machining, the optical axis of the laser beam passed through the optical system is not affected, and the optimum gap is obtained at all times. Thus, the laser beam machining apparatus can stably carry out machining operations with high accuracy.

In addition, in the laser beam machining apparatus of the invention, the length of extension of the nozzle in the machining head is changed by motive power with the position of the optical system maintained unchanged in the machining head, and the means for measuring the gap between the nozzle and the workpiece is provided, so that, the result of measurement is utilized to change the length of extension of nozzle, thereby to maintain the distance between the nozzle and the workpiece constant. Hence, even if, in focusing the laser beam on the lower surface of the workpiece, the thickness of the latter changes, the gap can be readily set to the most suitable value. In addition, even when the focal position of the laser beam is shifted from the upper surface of the workpiece to the lower surface during machining, the optimum gap is obtained at all times. Thus, the laser beam machining apparatus of the invention can stably carry out machining operations with high precision.

What is claimed is:

1. A laser beam machining apparatus comprising:
   an optical system for concentrating a laser beam on a workpiece;
   holding means for holding said optical system;
   first drive means for moving said holding means along an optical axis of said laser beam;
   a nozzle slidably engaged with said holding means, for jetting a machining gas; and
   second drive means for moving said nozzle.

2. The laser beam machining apparatus as claimed in claim 1, further comprising controlling means for controlling said first drive means and said second drive means, said first driving means being controlled to move said holding means in a predetermined direction, and said second driving means being controlled to move said nozzle in a reverse direction relative to said predetermined direction.

3. The laser beam machining apparatus as claimed in claim 2, wherein an amount of a movement of said nozzle is controlled to equalize an amount of a movement of said holding means.

4. A laser beam machining apparatus comprising:
   an optical system for concentrating a laser beam on a workpiece;
   holding means for holding said optical system:
   first drive means for moving said holding means along an optical axis of said laser beam;
   first detecting means for detecting the distance between said holding means and said workpiece;
   a nozzle slidably engaged with said holding means, for jetting a machining gas or the like;
   second drive means for moving said nozzle; and
   second detecting means for detecting the distance between said nozzle and said workpiece.

5. The laser beam machining apparatus as claimed in claim 4, further comprising controlling means for controlling said first drive means and said second drive means, said first driving means being controlled to move said holding means in a predetermined direction, and said second driving means being controlled to move said nozzle in a reverse direction relative to said predetermined direction.

6. The laser beam machining apparatus as claimed in claim 5, wherein an amount of a movement of said nozzle is controlled to equalize an amount of a movement of said holding means.

7. The laser beam machining apparatus as claimed in claim 4, further comprising controlling means for controlling said second drive means in response to the detection of said second detecting means.

* * * * *